United States Patent
Mailey et al.

[11] Patent Number: 5,931,755
[45] Date of Patent: Aug. 3, 1999

[54] PULLEY MADE FROM COMPOSITE MATERIAL

[76] Inventors: John Mailey, 5028 McCandlish, Grand Blanc; John Cooper, 7247 McCandlish, Grand Blank, both of Mich. 48439

[21] Appl. No.: 08/812,355

[22] Filed: Mar. 5, 1997

Related U.S. Application Data

[60] Provisional application No. 60/012,909, Mar. 6, 1996.

[51] Int. Cl.$^6$ ............ F16H 55/06; F16H 55/48; F16H 55/36
[52] U.S. Cl. ............ 474/161; 474/190; 474/199; 474/903
[58] Field of Search ............ 474/190, 902, 474/161, 199, 903

[56] References Cited

U.S. PATENT DOCUMENTS

| | | | |
|---|---|---|---|
| 3,788,155 | 1/1974 | Cigala et al. | 474/190 |
| 4,012,961 | 3/1977 | Cameron | 474/190 |
| 4,034,616 | 7/1977 | Rauscher | 474/190 |
| 4,468,210 | 8/1984 | McCutchan, Jr. | 474/902 |
| 4,473,363 | 9/1984 | McCutchan, Jr. | 474/190 |
| 4,482,340 | 11/1984 | Kovaleski | 474/190 |
| 4,570,226 | 2/1986 | Molloy et al. | 474/190 |
| 4,781,661 | 11/1988 | Emmett | 474/190 |
| 4,840,758 | 6/1989 | Thorsrud | 264/26 |
| 5,368,525 | 11/1994 | Funahashi | 474/190 |
| 5,453,056 | 9/1995 | Ullrich et al. | 474/902 |
| 5,720,685 | 2/1998 | Malone | 474/190 |

*Primary Examiner*—John A. Jeffery
*Assistant Examiner*—Matthew A. Kaness
*Attorney, Agent, or Firm*—Harness, Dickey & Pierce, P.L.C.

[57] ABSTRACT

A pulley is provided which is capable of being used as an alternator pulley. The pulley has a central hub portion for connecting the pulley to a shaft and a belt engaging portion disposed radially outward from the central hub portion. The central hub portion and the belt engaging portion are injection molded from a thermoplastic polyphenylene sulfide polymer material. The pulley provides approximately a 75% weight reduction in comparison to conventional metal pulleys used in automotive applications. The pulley is injection molded having a sprue gate located substantially in a center of said central hub portion. A bushing is optionally provided in a center opening in said central hub portion.

6 Claims, 5 Drawing Sheets

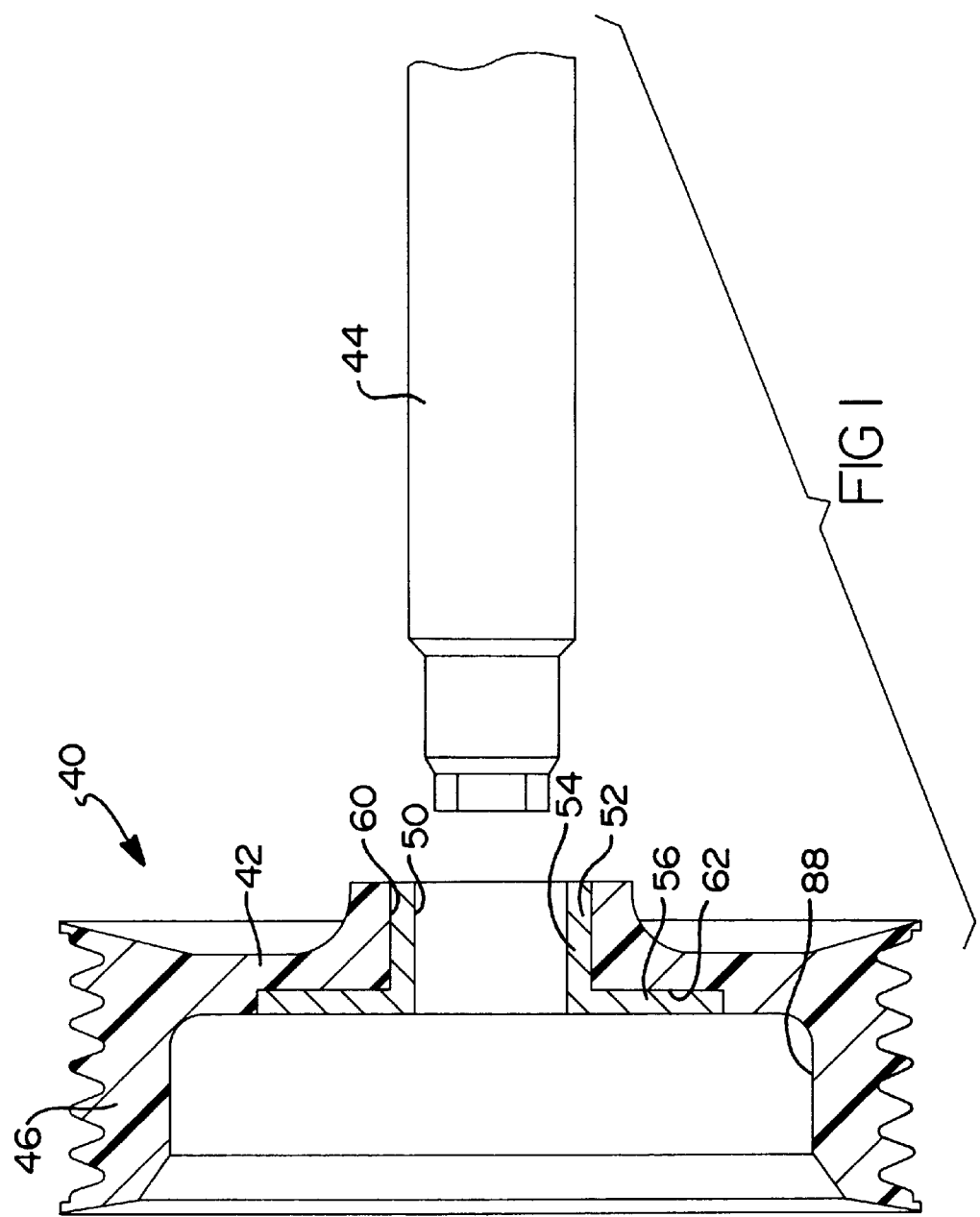

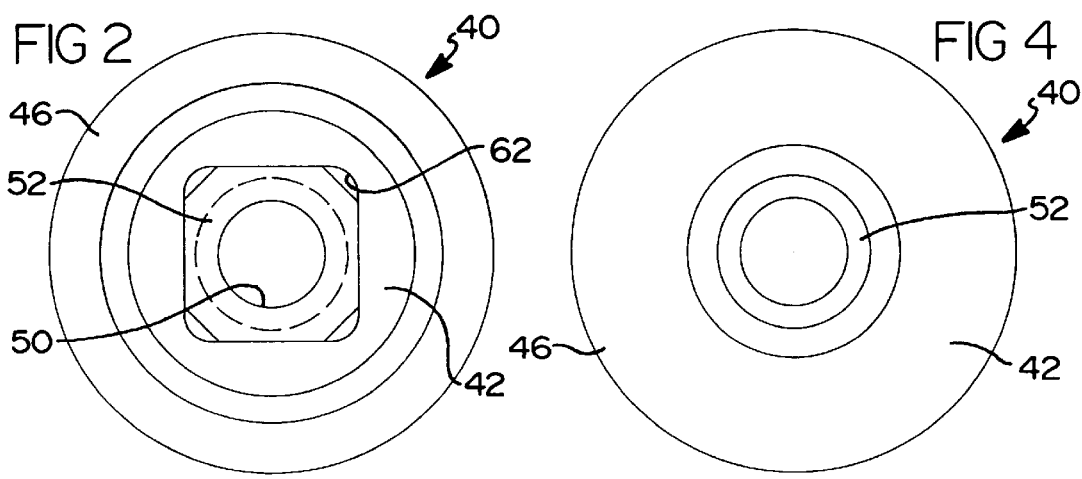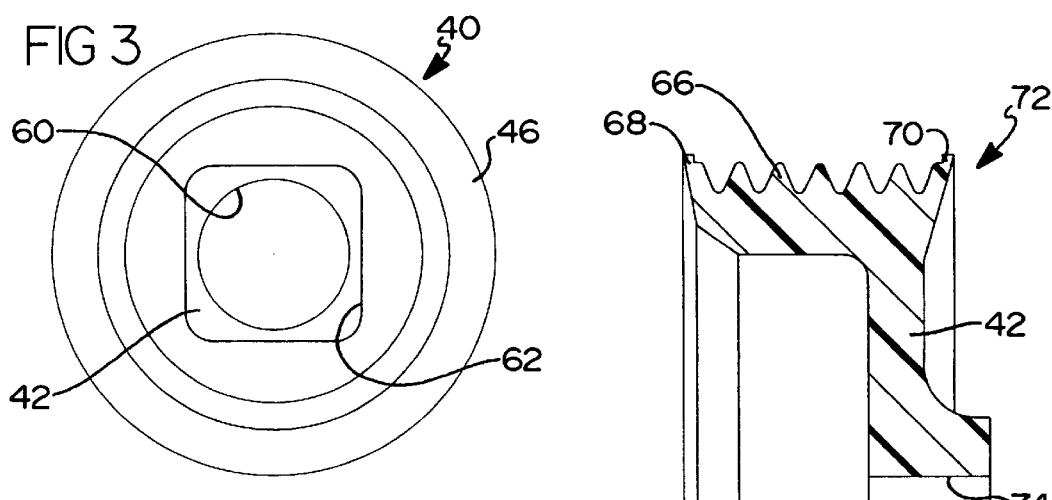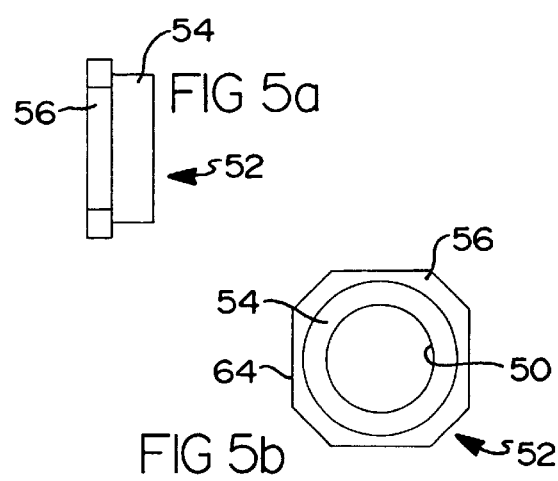

PULLEY MADE FROM COMPOSITE MATERIAL

This Application is a provision of Ser. No. 60/012,909 filed Mar. 6, 1996.

BACKGROUND OF THE INVENTION

1. Field of the Invention

The present invention relates generally to automotive pulleys and a method of making and, more specifically, to a pulley made from composite material which is capable of withstanding the extreme forces exerted of an automotive engine environment.

2. Description of Background Art

The automotive industry is currently working diligently toward meeting increased fuel economy and pollution control standards. Central to these objectives, weight reduction has become a major focus among the automotive manufacturers and their numerous suppliers. A reduction in vehicle weight results in improved fuel economy which corresponds with reduced pollution output.

For many years, the automotive industry has attempted to replace heavier metal components with components made from lighter composite materials. One area of focus in this effort has been the replacement of the metal pulleys used in the belt drive system of an internal combustion engine. Virtually all automotive vehicles use a drive belt and a series of pulleys in order to drive the various vehicle accessories, such as the alternator, air conditioning unit, power steering system, engine fan, and air pump. The drive belt which drives each of these accessories is driven by a pulley that is commonly connected to the crank shaft of the internal combustion engine.

An exemplary belt drive system is shown in FIG. 10, in which a belt 10 is driven by a pulley 12 connected to a crank shaft of the internal combustion engine (not shown). The belt 10 is in driving engagement with a pulley 14 which is connected to a fan. The belt 10 also drives a series of pulleys associated with an air pump 16, an alternator 18, an air conditioning unit 20, and a power steering unit 22. An idler 24 is provided for maintaining the tension in the belt 10. In FIG. 9, a serpentine drive belt 10 is shown in driving connection with an alternator pulley 18 which is mounted to an alternator drive shaft 28 of alternator 30.

Of all the pulleys in the belt drive system, the alternator pulley is exposed to the highest forces. Heretofore, the automotive industry has not developed a pulley made of light weight composite material which is capable of withstanding the forces imposed upon an alternator pulley. In particular, the prior pulley designs have suffered from the drawback that the materials tested lack the requisite surface hardness or are unstable under the extreme forces and high temperatures to which they are exposed in a belt drive system of an internal combustion engine. In particular, an internal combustion engine typically runs at approximately 20,000 rpm while the pulley associated with the alternator is commonly driven at approximately a 3 to 1 ratio with respect to the engine rotation which yields an alternator pulley rotation of approximately 60,000 rpm. In addition, the temperatures under the hood of an automotive vehicle are commonly above 200° F. and the vibrations that the pulleys are exposed to are extremely intense.

The automotive industry has also strived to reduce noise and vibration. Composite materials have been known to contribute to noise and vibration reduction in many applications. The reduction of noise and vibration associated with composite materials is generally attributable to the dampening effect of the molecular structure of the composite materials.

Occidental Chemical Corp. and its Durez Division have produced a line of pulleys made from a composite material called phenolics. Phenolics is a thermoset material which generally means that the material is a high molecular weight polymer that solidifies or "sets" irreversibly when heated. Thermoset materials also often require the addition of "curing" agents. Phenolics pulleys have proven to be acceptable for certain applications in the automotive industry. For example, the phenolics pulleys have been incorporated into the power steering assemblies of a line of cars and light trucks. However, the pulleys which are used on the power steering assemblies are not exposed to the high forces that are applied to an alternator pulley and phenolics pulleys have been found to be too brittle and unstable to withstand the forces required for alternator pulleys.

It is therefore desirable to provide a light-weight automotive pulley which is capable of withstanding the forces exerted thereon when assembled on an alternator of an internal combustion engine.

SUMMARY OF THE INVENTION

Accordingly, it is an object to the present invention to provide an automotive pulley made of light-weight composite material which is capable of withstanding the forces exerted on an alternator pulley.

It is yet another object to the present invention to provide an automotive pulley which reduces noise and vibrations emitted from an automotive engine.

It is still another object of the present invention to provide an automotive pulley which is simple in structure, inexpensive to manufacture, easy to mass produce, and is durable in use.

These and other objects of the present invention are obtained by providing a pulley with a central hub portion for connecting the pulley to a shaft and a belt engaging portion disposed radially outward from the central hub portion. The central hub portion and the belt engaging portion are injection molded from a thermoplastic material. The thermoplastic material is a polyphenylene sulfide (PPS) polymer. The central hub portion can also be provided with a centrally disposed opening having a bushing received therein for withstanding the high forces necessary for securely mounting the pulley to a shaft.

The objects of the present invention are also obtained by providing a method of making a pulley from a thermoplastic polyphenylene sulfide (PPS) polymer material comprising the steps of providing a thermoplastic polyphenylene sulfide polymer material, heating the thermoplastic polyphenylene sulfide polymer material to a temperature of between 590° and 640° F. and injecting the heated thermoplastic material into a hot oil mold having an internal configuration of a pulley with a central hub portion and a belt engaging portion radially extending from the central hub portion. The hot oil mold is preferably heated to a temperature greater than 275° F.

The pulleys made from a thermoplastic polyphenylene sulfide polymer material according to the principles of the present invention contribute to an approximately 5 to 1 weight reduction in comparison with the conventional metal pulleys they replace. With a metal bushing in their center portion, the pulleys of the present invention still provide an approximately 4 to 1 weight reduction in comparison to the conventional metal pulleys.

The pulleys according to the present invention are also less expensive to manufacture than the conventional metal pulleys. Cost projections indicate that the overall reduction in cost per pulley to be approximately one dollar in comparison to the cost of conventional metal pulleys. This cost reduction will translate to a savings to the automotive industry of millions of dollars each year.

The reduction in pulley weight has further benefits as well, including corresponding weight and cost reductions in the design of an alternator or any other accessory on which the pulleys are assembled. In particular, because the pulleys are reduced in weight, the forces on the bearings which support the shaft on which the pulley is mounted are also reduced. Thus, the bearings can be made to less exacting standards which correspond to further cost and weight reductions.

Another benefit of the present invention is that the thermoplastic polyphenylene sulfide (PPS) polymer material used is recyclable. Thus, any pulleys made from thermoplastic PPS material that are defective and any portions which are removed from a molded pulley during post machining operations can be reprocessed and reused. Contrary to this, the thermoset phenolics material irreversibly sets after it is heated during manufacture and is therefore not recyclable.

In addition, the thermoplastic PPS material used according to the present invention can be molded much more quickly than the thermoset phenolics material. In particular, the thermoplastic PPS material can be molded in approximately 30 seconds while the thermoset phenolics material requires approximately 1 and ½ minutes. Thus, the thermoplastic PPS pulleys can be manufactured approximately three times faster than the thermoset phenolics pulleys.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 1 is a cross-sectional view of a pulley made of composite material and having a bushing disposed within a central hub portion thereof according to the principles of the present invention;

FIG. 2 is a plan view of the automotive pulley shown in FIG. 1;

FIG. 3 is a plan view of the automotive pulley shown in FIG. 1 with the bushing not yet inserted in the opening in the central hub portion;

FIG. 4 is a plan view from the opposite side of the pulley of FIG. 2 with the bushing inserted in the opening in the central hub portion of the pulley;

FIG. 5a is a side view of the bushing shown in FIGS. 2–4;

FIG. 5b is a plan view of the bushing shown in FIG. 5a;

FIG. 6 is a cross-sectional view of the automotive pulley without a bushing, according to a second embodiment of the present invention;

DETAILED DESCRIPTION OF THE PREFERRED EMBODIMENTS

Figure 9:
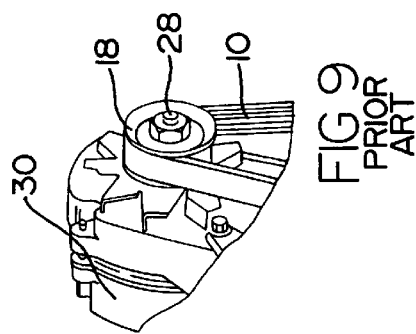
FIG. 9 is a perspective view of an alternator having a pulley mounted thereto and being drivingly connected to a serpentine belt.
Figure 10:
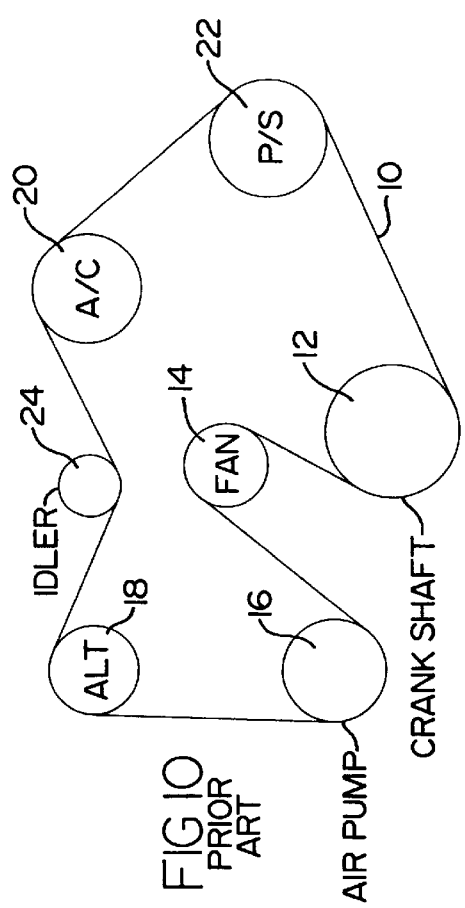
FIG. 10 is a schematic view of an exemplary main belt drive line of an internal combustion engine.

The present invention relates to an automotive pulley 40 made of thermoplastic material and a method of making the automotive pulley. More particularly, the automotive pulley 40 is made of a linear polyphenylene sulfide (PPS) polymer. The pulley 40 according to a preferred embodiment of the present invention includes a central hub portion 42 which is designed to be fixably mounted to a shaft 44 which is either a drive or a driven shaft. A belt engaging portion 46 extends radially from the central hub portion 42 of the pulley 40.

The central hub portion 42 according to one embodiment of the present invention is provided with a central opening 50 which receives the shaft 44 for fixably mounting the pulley 40 to the shaft 44. According to a preferred embodiment, a bushing 52 having a hollow cylindrical portion 54 and a radially extending flange portion 56 is received by the central hub portion 42 of the pulley 40. The bushing 52 is preferably made of P-20 aluminum although it should be understood that other materials, which are capable of withstanding the forces which are applied to the insert when the pulley is mounted on a shaft and in operation, may be used. The hollow cylindrical portion 54 of the bushing 52 is received in a central opening 60 of the thermoplastic portion of the pulley 40. As shown in FIG. 3, the thermoplastic portion of the pulley 40 is shown without the bushing 52. The central opening 60 and the hub portion 42 of the composite pulley is provided with a radially disposed recessed insert receiving portion 62 which receives the flange portion 56 of the bushing 52. A snug fit is preferably provided between the outer surface of the flange portion 56 and the inwardly facing surface of the recessed insert receiving portion 62.

A plan view of the pulley 40 is shown in FIG. 4, from the opposite side shown in FIG. 2, with the bushing 52 received in the recessed portion 62 of the central hub portion 42 of the pulley 40. A side view and a plan view of the bushing 52 is shown in FIG. 5a and 5b, respectively. The bushing 52 includes a hollow cylindrical portion 54 and a radially extending flange portion 56 connected to the hollow cylindrical portion 54. The flange portion 56 of the bushing 52 is preferably provided with at least one edge 64 which is capable of transmitting torque from the bushing 52 to the thermoplastic portion of the pulley 40. According to a preferred embodiment, the flange 56 has a substantially square configuration, however it should be understood that other configurations may be used. The hollow cylindrical portion 54 is preferably 0.002 of an inch thicker than the central opening 60 so that when the pulley 40 is assembled, only the bushing 52 is contacted by the shaft and the nut on the shaft.

Figure 11:
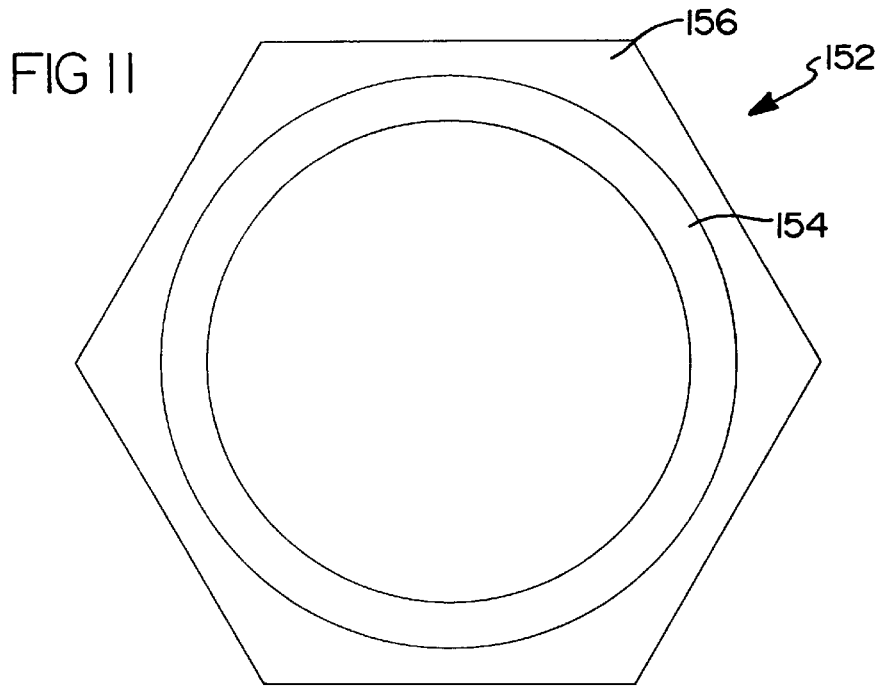
FIG. 11 is a plan view of a bushing according to another embodiment of the present invention.
Figure 12:
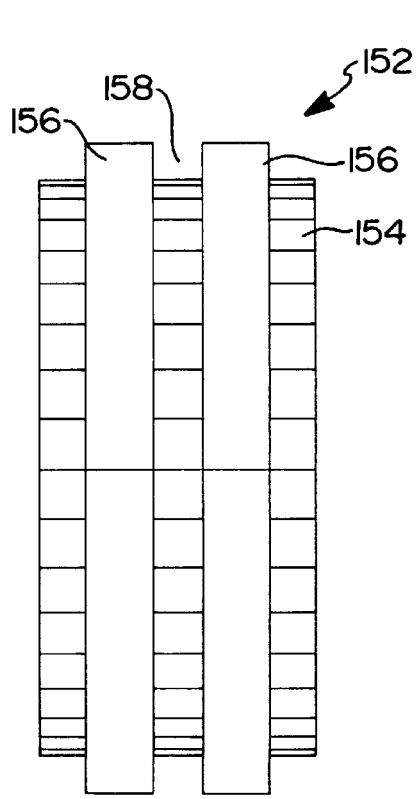
FIG. 12 is a side view the bushing shown in FIG. 11.
Figure 13:
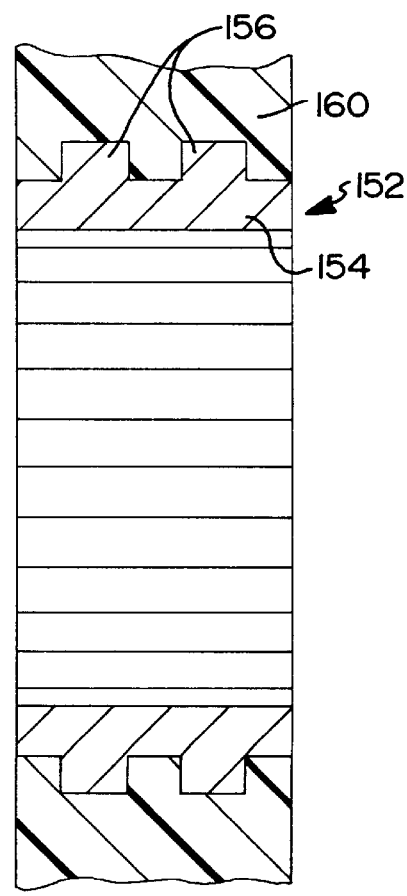
FIG. 13 is a partial cross sectional view of a pulley made of composite material and having the bushing of FIG. 11 disposed within a central hub portion thereof according to the principles of the present invention.

Alternatively according to another preferred embodiment, a bushing 152, as shown in FIGS. 11–13 may also be used. Bushing 152 includes a hollow cylindrical portion 154 and a pair of radially extending flanges 156. According to this embodiment, the bushing 152 is insert molded in the pulley 160, as illustrated in FIG. 13. The radial flanges 156 are preferably provided with a hexagonal outer perimeter, although other configurations may be used. The radial flanges 156 are disposed longitudinally inward from the ends of the hollow cylindrical portion 154. A gap 158 is preferably provided between radial flanges 156 in order to increase the amount of surface contact area between the pulley 160 and the bushing 152, as shown in FIG. 13.

Figure 7:
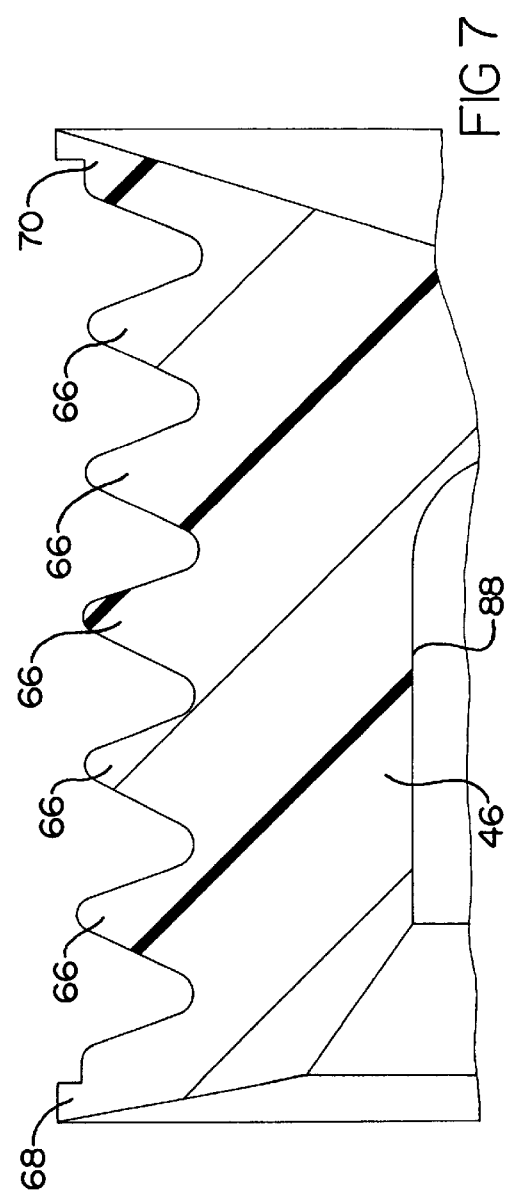
FIG. 7 is a detail view of the cross section of the grooves of the belt engaging portion of the pulley according to the principles of the present invention.

In FIG. 7, a detailed view of the belt engaging portion 46 of the pulley 40 is shown in cross section. The belt engaging portion 46 includes a plurality of grooves 66 and first and second radially extending sidewall portions 68, 70, respectively. The grooves 66 are designed to receive a serpentine belt 10, as shown in FIG. 9. The first and second radially extending sidewall portions 68, 70 secure the belt 10 from moving laterally. Although the pulley 40 has been disclosed with a belt engaging portion 46 for receiving a serpentine-type belt, it should be understood that the belt engaging portion may also be provided with a V-shaped configuration for engaging a V-belt. In addition, it should also be recognized that the central hub portion 42 should not be limited to the precise configuration as disclosed and may be designed with a plurality of spaced bolt holes for mounting the pulley to a shaft.

In FIG. 6, a pulley 72 according to a second embodiment of the present invention is shown in which like reference numerals designate the same features as are designated in FIG. 1. In FIG. 6, the pulley 72 is provided without a bushing 52. Thus, the central opening 74 of the central hub portion 72 is designed to be mounted directly onto a shaft.

The linear polyphenylene sulfide (PPS) polymer material used to make the pulley of the present invention is produced by Hoescht Celanese Corporation under the name FORTRON PPS™, The linear polyphenylene sulfide (PPS) polymer is produced by a polycondensation reaction of p-dichlorobenzene and sodium sulfide which yields the PPS polymer with the following structure: The linear polyphenylene sulfide (PPS) polymer is then combined with between approximately 20% and approximately 60% glass fiber reinforcement with a 40% glass fiber reinforcement being preferred.

Figure 8:
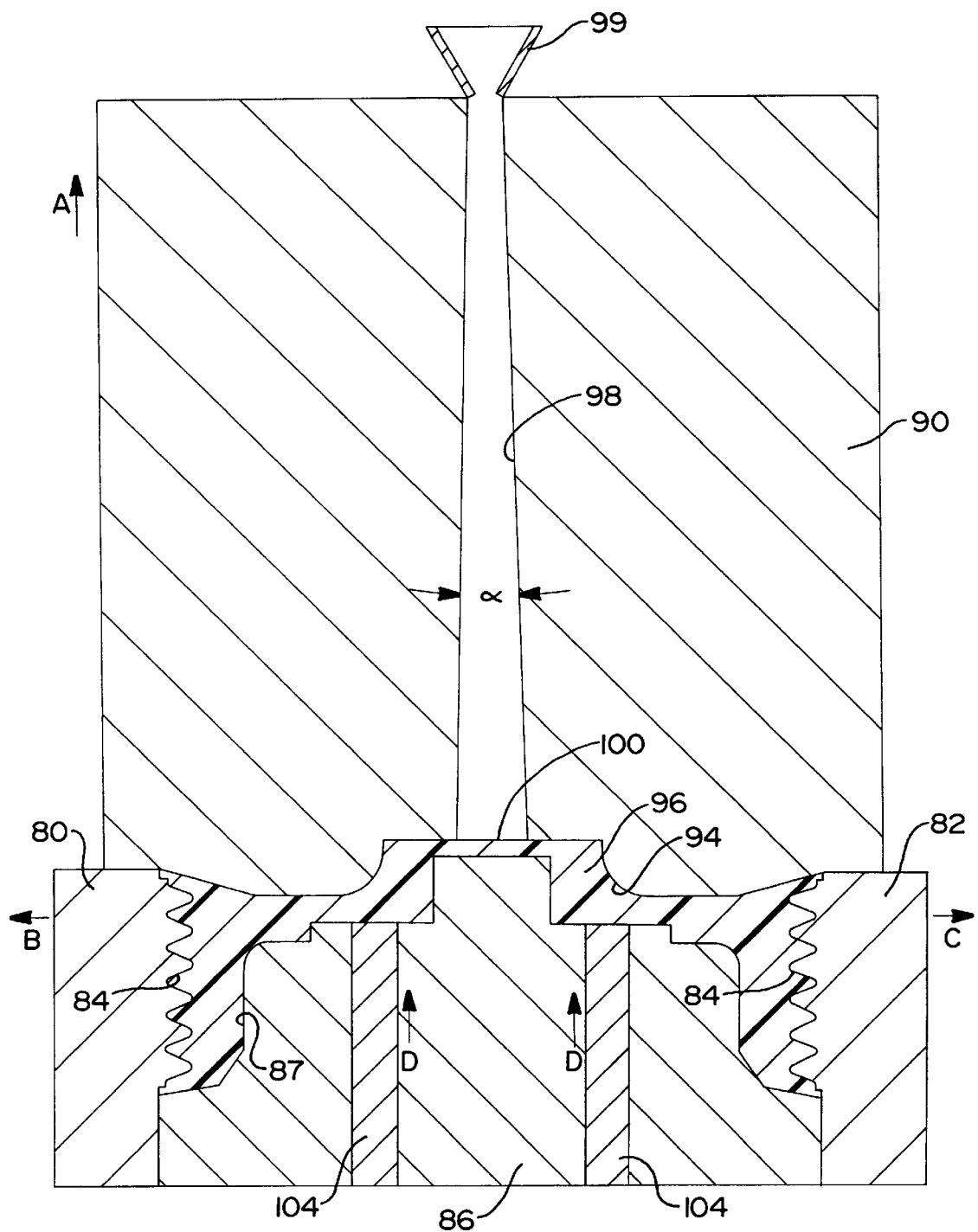
FIG. 8 is a cross sectional view of the tool used for injection molding the composite material pulley according to the principles of the present invention.

With reference now to FIG. 8, the method of injection molding the pulley, according to the principles of the present invention, will be described. In FIG. 8, first and second outer movable dies 80, 82 are provided for defining the radially outer surface of the belt engaging portion 46 of the pulley 40. The first and second radially movable members, 80, 82 are both semi-cylindrical in shape so as to define a complete outer cylindrical wall 84 around the pulley 40. The outer cylindrical wall 84 defines the grooves 66 and the first and second radially extending sidewall portions 68, 70, respectively, of the belt engaging portion 46. A male member 86 is provided having an external wall surface 87 for defining the inner wall 88 of the pulley 40. A movable upper die portion 90 is provided for defining the upper wall surface 94 of the mold cavity 96 which is configured substantially in the shape of the composite material portion of the pulley 40. The movable wall portion 90 is provided with a sprue channel, (or feed opening) 98 through which the molten thermoplastic PPS material is received from a nozzle 99 of an injection device. The sprue channel 98 is tapered at angle α between 3° and 10°.

The molten thermoplastic PPS material is injected into the injection mold cavity 96 through a gate or opening 100. The sprue channel 98 and the gate or opening 100 through which the molten thermoplastic PPS material enters the cavity 96 are located at the central axis of the mold cavity 96. In other words, the injection mold cavity 96 is center-gated so that the molten thermoplastic PPS material fills the cavity 96 in a symmetrical fashion in all radial directions as the molten thermoplastic PPS material travels radially outward through the central hub portion 42 and then sequentially fills each of the grooves 66 of the belt engaging portion 46 until the entire mold cavity 96 is completely filled with the thermoplastic PPS material. As a result of this center-gating process of injecting the molten thermoplastic PPS material, voids are eliminated from the final product.

According to a preferred embodiment of the present invention, the thermoplastic material is injected into the mold shown in FIG. 8, at a temperature of between 590° and 640° F. In addition, the width of the gate 100 is approximately 0.350 of an inch. Of course, one or more of these parameters may change depending on the size of the pulley being molded.

Because of the extremely high temperatures which are required for molding the thermoplastic PPS material, the mold, as shown in FIG. 8, is a hot oil mold which is heated to a temperature of approximately 275°–325° F. The molded product includes the central hub portion 42 and the belt engaging portion 46 of the pulley 40, as well as a sprue portion which is a slug of material that solidifies in the sprue channel 98 of the movable upper die portion 90. When the molded PPS material has solidified, the upper die portion 90 and the first and second outer movable dies 80, 82 are moved in the direction of arrows A, B, and C, respectively. Ejector pins 104 are preferably provided in the male member 86 for ejecting the molded product by movement of the ejector pins 104 in the direction of arrows D. The sprue portion is removed and the central opening 60 is formed in a machining operation after the pulley is molded. The portions of the molded product that are removed may be recycled so that essentially no scrap material is produced. The bushing 52 according to the first embodiment of the present invention is then press fit in the central opening 60 of the pulley 40 using approximately a 5 pound press so that the flange portion 56 is snugly received in the flange receiving recessed portion 62 of the thermoplastic portion of the pulley 40. The use of a low pressure press for inserting the bushing 52 avoids placing stresses on the thermoplastic PPS portion of the pulley 40 so that internal cracks are not created.

The pulleys that have been produced according to the present invention have been tested and found to be strong enough to withstand the forces exerted on an alternator pulley.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pulley, comprising:

a central hub portion for connecting said pulley to a shaft and having an axis of rotation through a center thereof; and a belt engaging portion disposed radially outward from said central hub portion;

wherein said central hub portion and said belt engaging portion are injection molded from a thermoplastic polyphenylene sulfide polymer material;

wherein said central hub portion is provided with a bushing which is insert molded therein, said bushing being provided with a hollow cylindrical portion for receiving a shaft and a pair of longitudinally spaced radial flange portions having a gap disposed therebetween.

2. The pulley according to claim 1, wherein said bushing is made of P-20 aluminum which is press fit in said centrally disposed opening.

3. The pulley according to claim 1, wherein said pair of flange portions of said bushing have a substantially hexagonal configuration.

4. The pulley according to claim 1, wherein said pair of longitudinally spaced radial flange portions are disposed longitudinally inward from ends of said hollow cylindrical body portion.

5. A pulley, comprising:

a central hub portion for connecting said pulley to a shaft and having an axis of rotation through a center thereof; and a belt engaging portion disposed radially outward from said central hub portion;

wherein said central hub portion and said belt engaging portion are injection molded from a thermoplastic material;

wherein said central hub portion is provided with a bushing which is insert molded therein, said bushing being provided with a hollow cylindrical portion for receiving a shaft and a pair of longitudinally spaced radial flange portions having a gap disposed therebetween.

6. The pulley according to claim 5, wherein said pair of flange portions of said bushing have a substantially hexagonal configuration.

\* \* \* \* \*